US008009910B2

(12) United States Patent
Lötjönen

(10) Patent No.: US 8,009,910 B2
(45) Date of Patent: Aug. 30, 2011

(54) METHOD, A SYSTEM, A COMPUTER PROGRAM PRODUCT AND A USER INTERFACE FOR SEGMENTING IMAGE SETS

(75) Inventor: Jyrki Lötjönen, Tampere (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 928 days.

(21) Appl. No.: 11/418,177

(22) Filed: May 5, 2006

(65) Prior Publication Data

US 2007/0258643 A1 Nov. 8, 2007

(51) Int. Cl.
*G06K 9/34* (2006.01)
*G06K 9/00* (2006.01)

(52) U.S. Cl. ........................ 382/173; 382/131
(58) Field of Classification Search .................... 382/173
See application file for complete search history.

(56) References Cited

U.S. PATENT DOCUMENTS

| | | | |
|---|---|---|---|
| 5,633,951 A * | 5/1997 | Moshfeghi | 382/154 |
| 5,937,083 A * | 8/1999 | Ostuni | 382/131 |
| 5,946,425 A * | 8/1999 | Bove et al. | 382/294 |
| 5,956,418 A * | 9/1999 | Aiger et al. | 382/154 |
| 6,031,935 A | 2/2000 | Kimmel | |
| 6,169,817 B1 * | 1/2001 | Parker et al. | 382/131 |
| 6,295,464 B1 * | 9/2001 | Metaxas | 600/407 |
| 6,491,702 B2 * | 12/2002 | Heilbrun et al. | 606/130 |
| 6,545,678 B1 * | 4/2003 | Ohazama | 345/427 |
| 6,556,695 B1 * | 4/2003 | Packer et al. | 382/128 |
| 6,611,615 B1 * | 8/2003 | Christensen | 382/130 |
| 6,694,166 B2 * | 2/2004 | Salome et al. | 600/410 |
| 6,885,368 B2 * | 4/2005 | Rotge | 345/420 |
| 2002/0034323 A1 | 3/2002 | Kuth | |
| 2004/0139096 A1 * | 7/2004 | Rising, III | 707/100 |
| 2004/0264778 A1 * | 12/2004 | Liang et al. | 382/203 |
| 2005/0031210 A1 | 2/2005 | Shen et al. | |
| 2005/0057562 A1 | 3/2005 | Cowan et al. | |
| 2006/0159322 A1 | 7/2006 | Rinck et al. | |

FOREIGN PATENT DOCUMENTS

| | | |
|---|---|---|
| DE | 102004043677 A1 | 3/2006 |
| WO | WO-01/01859 A1 | 1/2001 |
| WO | WO-2004/111936 A1 | 12/2004 |

OTHER PUBLICATIONS 4D deformable models with temporal constraints: application to 4D cardiac image segmentation, Medical Image Analysis, published online Nov. 4, 2004, pp. 87-100, Montagnat et al.*
Correction of Movement Artifacts from 4-D Cardiac Short- and Long-Axis MR Data, MICCAI 2004, Springer-Verlag Berlin Heidelberg, pp. 405-412, Lotjonen et al.*

(Continued)

*Primary Examiner* — David P Zarka
(74) *Attorney, Agent, or Firm* — Venable LLP; Eric J. Franklin

(57) ABSTRACT

The current invention relates to the segmentation of image sets in four dimensions. A method for segmenting image sets comprises steps for defining deformation by at least one control point in a deformation area defined in four dimensions and modifying the content of said deformation area based on said control point, wherein the steps are iterated. The invention also relates to a system, a computer program product and a graphical user interface.

16 Claims, 3 Drawing Sheets

OTHER PUBLICATIONS

A Dynamic 3-D Cardiac Surface Model from MR Images, Computers in Cardiology, published Sep. 28, 2005, pp. 423-426, Delhay et al.*

J. Lötjönen et al.; Statistical shape model of atria, ventricles and epicardium from short- and long-axis MR images; Medical Image Analysis; 2004; pp. 371-386.

Hans C. Van Assen et al.; SPASM: A 3D-ASM for segmentation of sparse and arbitrarily oriented cardia MRI data; Medical Image Analysis; 2006; pp. 286-303.

Jyrki Löjönen; Construction of patient-specific surface models from MR images: application to bioelectromagnetism; Computer Methods and Programs in Biomedicine 72; 2003; pp. 167-178.

Maria Lorenzo-Valdés et al; Segmentation of 4D cardiac MR images using a probabilistic atlas and the EM algorithm; Medical Image Analysis; 2004; pp. 1-11.

J. Lötjönen and T. Mäkelä; Elastic matching using a deformation sphere; pp. 1-8.

Jyrki Lötjönen et al.; Correction of Motion Artifacts From Cardiac Cine Magenetic Resonance Images; Academic Radiology, vol. 12, No. 10, Oct. 2005; pp. 1273-1284.

Gérard, Olivier, et al., "Efficient Model-Based Quantification of Left Ventricular Function in 3-D Echocardiography," *Transactions on Medical Imaging*, vol. 21, No. 9, pp. 1059-1068, Sep. 2002.

International Search Report, dated Aug. 31, 2007, issued in connection with counterpart International Application No. PCT/FI2007/050249.

Written Opinion of the International Searching Authority, dated Aug. 31, 2007, issued in connection with counterpart International Application No. PCT/FI2007050249.

* cited by examiner

METHOD, A SYSTEM, A COMPUTER PROGRAM PRODUCT AND A USER INTERFACE FOR SEGMENTING IMAGE SETS

FIELD OF THE INVENTION

The current invention relates generally to the segmentation of image sets. In particular, the current invention relates to the segmentation of image sets in four dimensions.

BACKGROUND OF THE INVENTION

The segmentation of medical images is needed for computing clinically relevant measures of an object of interest from images, or for visualizing the objects of interest for better diagnosing or treating of patients. The segmentation of images means that an object of interest, such as an organ in medical imaging, is distinguished from the background of the image. Conventionally, the segmentation has been done manually or automatically. In the manual segmentation the user outlines the object, whereas the automatic segmentation aims at identifying the contours of the object by means of image processing. The drawback of the manual segmentation is that it is extremely time consuming. The number of images per patient examination is continuously increasing. For example, several hundreds of images can be acquired during one cardiac magnetic resonance (MR) imaging examination. However, the time a medical professional can use for the interpretation of the images has not increased correspondingly. Therefore, the time used per image is becoming notably short. The drawback of the automatic segmentation, on the other hand, relates to accuracy. The automatic segmentation, even though it is faster than the manual segmentation, can provide contours that deviate significantly from the actual contours of the object.

Lorenzo et al. in "Segmentation of 4D cardiac MR images using a probabilistic atlas and the EM algorithm" (Medical Image Analysis 8(3) (2004) p. 255-256) disclose a segmentation tool for the segmentation of cardiac images. Lorenzo et al. use the expectation maximization algorithm and probabilistic atlas to segment left and right ventricle. Lötjönen et al. in "Statistical shape model of atria, ventricles and epicardium from short and long-axis MR images" (Medical Image Analysis 8(3) (2004) p. 371-386) and Assen et al. in "A 3D-ASM for segmentation of sparse and arbitrarily oriented cardiac MRI data (Medical Image Analysis 10(2) (2006) p. 286-303) use image data from more than one imaging directions, typically acquired during cardiac studies. However, conventionally only two-dimensional short-axis images are segmented, and Simpson's rule for approximating definite integrals is used to compute the volumes.

Due to relatively high slice thickness in cardiac MR images, the modelling of, for example, apical and basal regions becomes difficult, and the use of several imaging directions makes the segmentation more accurate. The segmentation error of the methods of related art has been about two millimeters or more as the difference between two manually delineated segmentations has been slightly more than one millimeter.

What is needed is a solution for segmenting images of an object of interest. The solution should overcome the drawbacks of the state-of-art by providing a segmentation that is sufficiently robust, accurate and fast, so that it can be used in clinical practice.

SUMMARY OF THE INVENTION

The current invention is addressed to such a need. An object of the current invention is to provide a solution for segmenting images as accurately as by the manual segmentation, and in a short time that is acceptable in clinical practice. The idea behind the invention is a four-dimensional deformation sphere and its inclusion in the manual interaction in a smart way. The object of the invention is achieved by a method, a system, a computer program product and a graphical user interface for segmenting image sets.

The method according to one example of the invention comprises steps for i) defining deformation by at least one control point in a deformation area defined in four dimensions, ii) modifying the content of said deformation area based on said control point, wherein steps i) to ii) are iterated.

The system according to one example of the invention is capable of i) defining deformation by at least one control point in a deformation area defined in four dimensions, ii) modifying the content of said deformation area based on said control point, and iterating steps i) to ii)

A computer program product for segmenting image sets, comprising code means stored on a readable medium, adapted, when run on a computer, i) to define deformation by at least one control point in a deformation area defined in four dimensions, ii) to modify the content of said deformation area based on said control point, and to iterate steps i) to ii)

A graphical user interface for a system for segmenting image sets, configured i) to receive information on at least one control point in a deformation area defined in four dimensions, ii) to modify the content of said deformation area based on said control point, and to iterate steps i) to ii).

The current invention makes it possible that the user can generate a segmentation accuracy corresponding to the manual segmentation in only a few minutes for a set of image slices from spatial and temporal domains. Thanks to the invention, it is possible to use only one control point for the segmentation of four dimensions. This makes the segmentation faster and more accurate, because other dimensions in the deformation area are modified according to the control point.

The segmentation is based on a deformation area, which is e.g. in the form of a four-dimensional sphere, in all dimensions. Within this deformation area, at least one control point is defined. The control point is a point in a four-dimensional space. The control point defines the deformation for the content in the deformation area. The procedure including the definition of the control point and the deformation of the content, is iterated as long as the user or the system automatically determines the segmentation to be as accurate as needed.

DESCRIPTION OF THE DRAWINGS

The current invention will now be described in more detail with the following description of the invention and with reference to the drawings, in which.

DETAILED DESCRIPTION OF THE INVENTION

The current invention provides an interactive tool for segmenting four-dimensional images. A four-dimensional image is an image where, in addition to the spatial coordinates, also time has been taken into account. In the current detailed description, the images have been taken from the heart of a subject, but a skilled person will appreciate that the object of interest can be almost any object. The fourth dimension in the current invention gives information on the movement of the object. However, it should be noticed that the invention can also be applied with stationary objects. In the current detailed description, the heart is used as an example of the object of interest, but the skilled person should bear in mind that other alternatives are possible as well. It will be appreciated that if a segmentation tool is targeted for clinical practice, the time available for manual segmentation cannot be longer than a few minutes.

Figure 1:
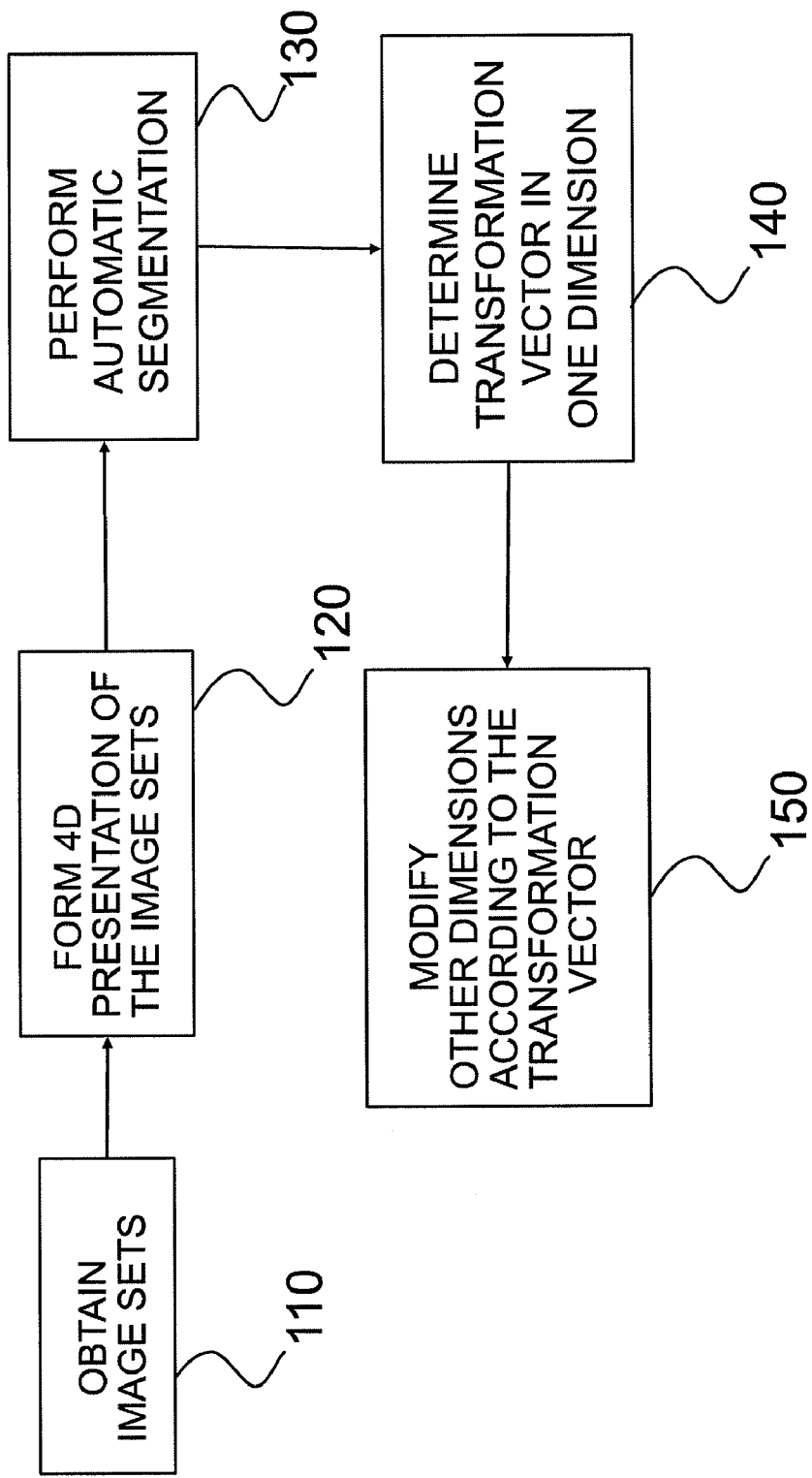
FIG. 1 presents a simple flow chart of an example of the method for segmenting image sets.

FIG. 1 presents an example of method steps that provide a segmentation according to the invention.

In order to start the segmentation, imaging is used for obtaining image sets (110). The image sets can be recorded by any known imaging device capable of e.g. MR imaging, tomography imaging or three-dimensional echo imaging. The image set may comprise left ventricle short-axis (SA) planes and long-axis (LA) images. It will be appreciated that for the purpose of the current invention the images are not necessarily required from different directions but they can be acquired in one direction as well. The number of SA and LA slices will depend on the size of the object of interest, e.g. the subject's heart. As an example, if the number of SA and LA slices is 4 to 5 and 4 to 7, respectively, and the number of different cardiac phases in an image set is 23 to 30, the number of slices is 250 to 300 per subject. The image sets are presented in four dimensions (120), wherein in addition to the spatial coordinates also time coordinate is involved. A geometric model, such as a set of triangulated surfaces of the heart from different time phases, is transformed on images (130). The transformation can be performed automatically or interactively. The model can then be modified interactively by a user, such as a medical professional, as proposed by the invention.

Deformation in Four Dimensions

In order to implement a deformation, the model is deformed iteratively in spatially and temporally constrained areas. In this example, the deformation area is in the form of a sphere, but obviously the area can have any shape, e.g. a rectangular, a square, an oval, a triangle or a combination of them, just to mention few. A point in four dimensions is denoted by X=(x, y, z, t), where (x, y, z) stands for the spatial coordinates and t for time. All points X inside the sphere with the radius r and the center $c=(x_c, y_c, z_c, t_c)$ are transformed by a vector v according to the following equation (140):

$$v = \frac{e^{-k\frac{(x-c_x)^2+(y-c_y)^2+(z-c_z)^2+(t-c_t)^2}{r^2}} - e^{-k}}{1.0 - e^{-k}} V$$

where a vector V can be defined interactively or automatically. This means that in the interactive deformation the user transforms a certain point inside the deformation sphere thus forming the vector V the other points (inside the sphere) are transformed respectively according to the vector v (150). In this example, the constant k is two. The equation produces a parallel vector field inside the sphere in such a way that the norm of the vector v in the center is ‖V‖, shortening to zero on the surface of the sphere or outside it. The transformation is topology preserving if the length of the vector ‖V‖ is shorter than 0.7 r.

Interaction in Four Dimensions

After the image sets have been obtained, possible movement artefacts, e.g. due to breathing, are corrected by using any known method, for example the one presented in Lötjönen et al. "Correction of Motion Artifacts from Cardiac Cine Magnetic Resonance Images" in Academic radiology, 2005. After that, either automatic segmentation or affine registration of 4D mean surface can be performed to fit the model close to the final borders in the images.

Figure 2A:
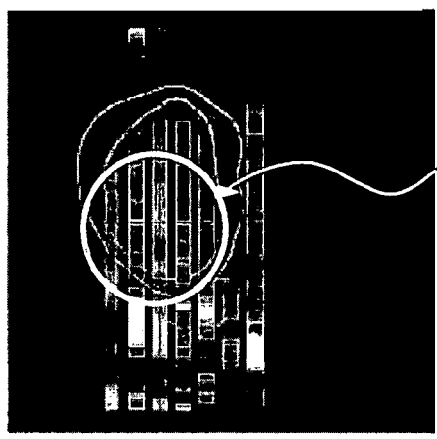
FIG. 2 presents an example of an object of interest in four dimensions.
Figure 2B:
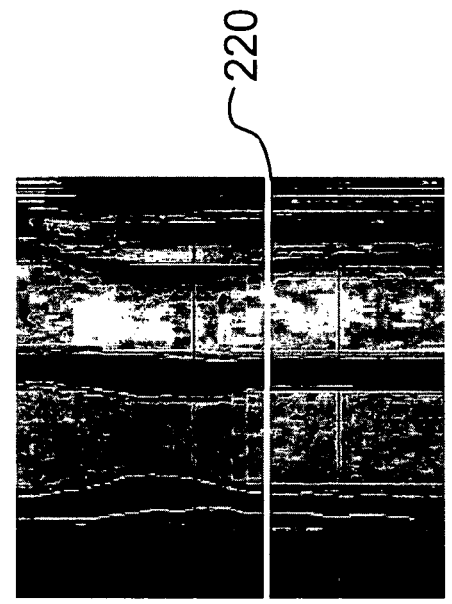
Figure 2C:
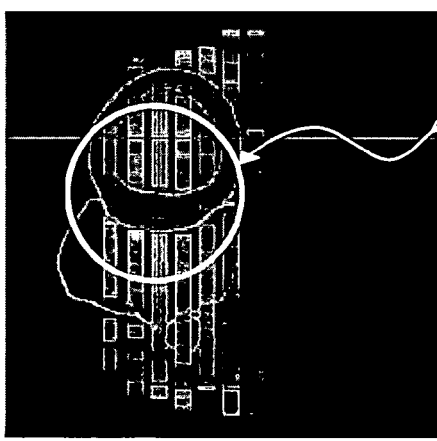

FIGS. 2A to 2D present the image sets in four dimensions. FIGS. 2A to 2C present spatial windows, in which FIG. 2B shows an original slice from a long-axis stack and FIGS. 2A and 2C show orthogonal cross-sections from the long-axis stack. The black stripes in FIGS. 2A and 2C are due to gaps between slices. The contours of the objects superimposed on the image data are derived from the cross-sections of the surface model and the corresponding slice from the stack. The user can switch between the stacks in real time. The white sphere (200) in FIGS. 2A to 2C shows a three-dimensional deformation area. The user can deform the surface within the deformation area either by dragging and dropping a point in the surface by the mouse, or by clicking a point to which the closest surface point should be moved. Although not visible in FIGS. 2A to 2C, the sphere also has a radius in the time domain, and all the time phases inside the radius from the current time phase are deformed simultaneously.

Figure 2D:
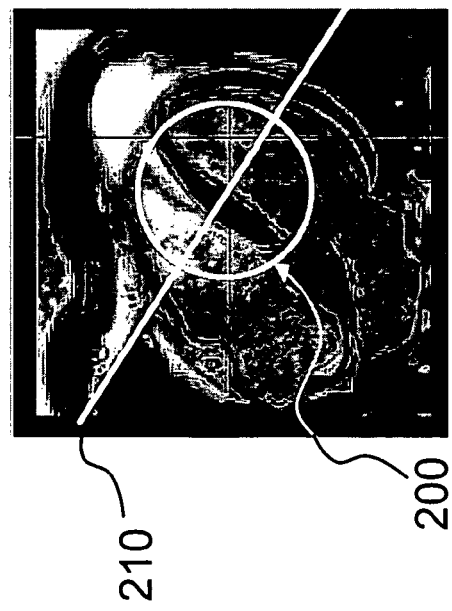

FIG. 2D presents a time window that links the spatial and time domains. As the user relocates the deformation sphere in any spatial windows presented in FIGS. 2A to 2C, the software defines the closest point on the surface and computes a three-dimensional line passing through the point in the direction of the surface normal (the line 210 in FIG. 2B). A line profile for each time phase of the gray-scale data is derived along the three-dimensional line. The time window in FIG. 2D is formed by stacking the line profiles. Simultaneously, the cross-sections of the surface model and the three-dimensional line are computed with all the time phases and projected to the time window. The white line (220) in the time window (FIG. 2D) shows the three-dimensional line in the time domain. The horizontal lines around the black line indicate the radius of the sphere in the time domain. As in the spatial windows (FIGS. 2A to 2C), the user can modify the surfaces also in the time window (FIG. 2D).

Figure 3:
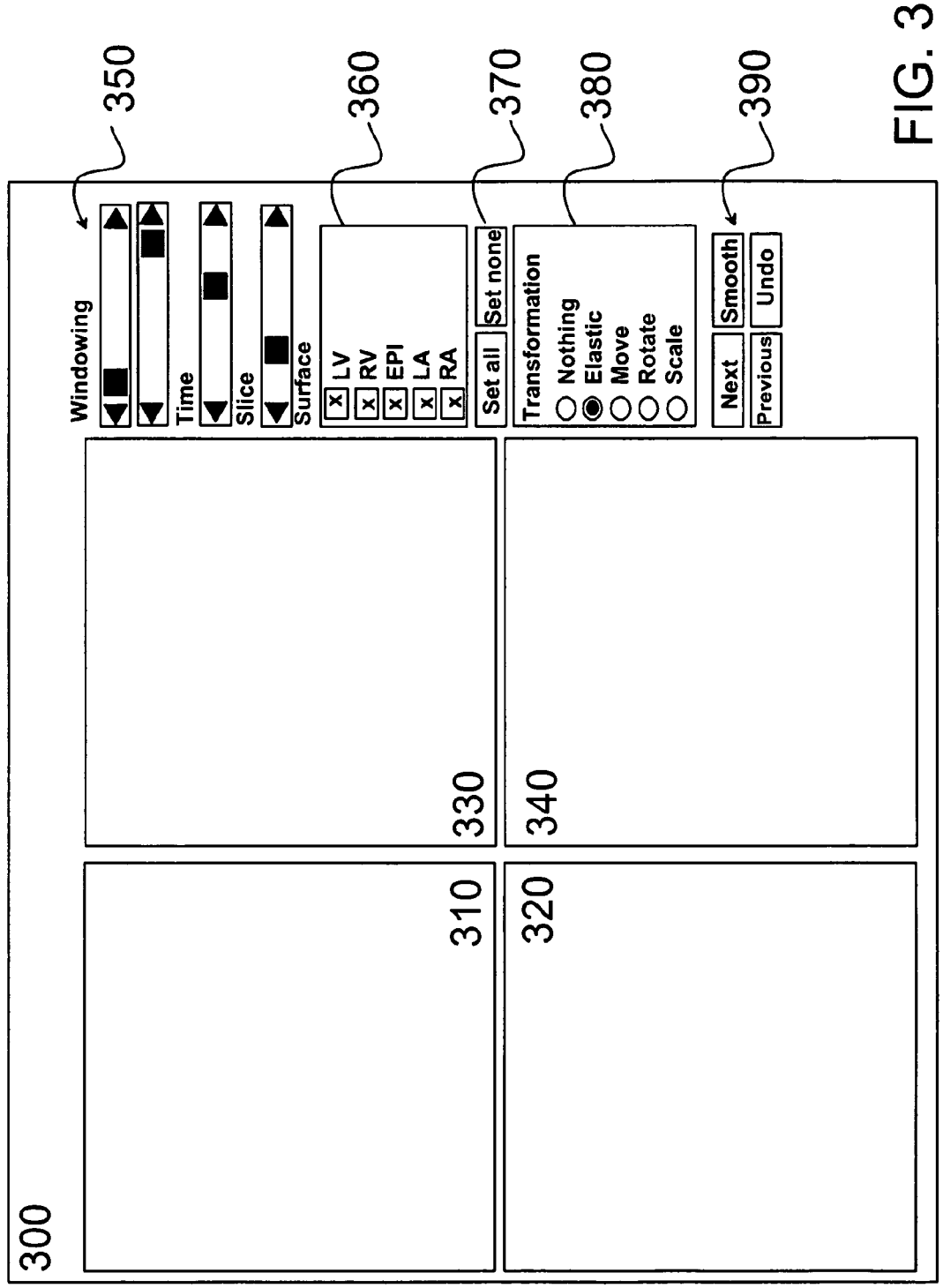
FIG. 3 presents an example of a user interface for segmenting image sets.

An example of a user interface for the segmentation is presented in FIG. 3. The user interface 300 comprises subwindows for each dimension. The subwindows 310 to 330 are spatial windows and the subwindow 340 is a time window. The subwindows present data as illustrated with FIGS. 2A to 2D. The user can modify the content of the subwindows by deforming the surface within the deformation area. A deformation in one subwindow will cause deformation in the other subwindows as well. The user interface 300 also comprises tools (350 to 390) for modifying the representation of the images. The appearance of the user interface can vary, and it can comprise more or fewer subwindows. However, better user experience can be acquired by having each dimension visible at the same time, whereby the user can immediately see the effect of the deformation in one subwindow in the other subwindows. The user interface can also comprise a variety of different deformation tools and other representation setting tools.

As stated above, the current invention relates to an interactive segmentation of images, such as cardiac images, in a short time. By means of the invention, the user can generate a segmentation accuracy corresponding to that of manual segmentation in few minutes for a set of cine slices. The system according to the invention comprises a segmentation device containing at least a computer program for implementing the segmentation procedure interactively with the user. The system can incorporate any number of databases or functionalities for enhancing efficiency of the system. The system can comprise imaging means or be connected to such. The system further comprises, or is connected to, a display for presenting the image data via a user interface. It will be appreciated that variations and modifications of the examples of the embodiment described are possible without departing from the scope of protection of the invention as set forth in the claims.

The invention claimed is:

1. A method for segmenting image sets, comprising:
defining deformation in a computer by at least one four-dimensional control point in a deformation area defined in in three spatial coordinates and a temporal coordinate, wherein the deformation area is spatially and temporally constrained,
modifying in a computer a content of said deformation area around said control point, wherein the modifying comprises transforming spatial and temporal coordinates of a point in the deformation area, wherein said transforming happens according to a vector field defined in terms of a transformation of said control point and difference between said control point and said point in the deformation area, the difference being calculated using spatial and temporal coordinates, wherein a norm of the transformation vector of said vector field at the control point is $\|V\|$, and wherein the norm of the transformation vector of said vector field is shorter than $\|V\|$ at a border of the deformation area, and
repeating the defining deformation and the modifying.

2. The method according to claim 1, wherein said deformation area comprises a plurality of deformation area points defined in spatial and temporal coordinates and said deformation area points span more than one spatial location and more than one time instance around said control point.

3. The method according to claim 1, wherein the modifying comprises transforming spatial and temporal coordinates of a point in the deformation area, wherein the deformation area comprises a deformation sphere, and wherein the transformation is implemented by an equation $$v = \frac{e^{-k\frac{(x-c_x)^2+(y-c_y)^2+(z-c_z)^2+(t-c_t)^2}{r^2}} - e^{-k}}{1.0 - e^{-k}} V$$

wherein x, y, z stand for spatial coordinates,
t stands for time,
V stands for a transformation vector for said control point,
v stands for a transformation vector for a point inside said deformation area,
k is a predefined constant,
r stands for a radius of the four-dimensional sphere,
$c_x$, $c_y$, $c_z$, $c_t$ stand for a center of the four-dimensional sphere in respective spatial coordinate, and
e is approximately 2.71828.

4. The method according to claim 1, wherein a display of a time dimension is formed by
determining a three-dimensional line,
deriving a line profile for the three-dimensional line in each time phase,
forming the display of time dimension by stacking the line profiles, and
indicating the constraint of the deformation area in the time dimension in the display of time dimension.

5. The method according to claim 4, wherein the control point is a point in a four-dimensional space, the method further comprising:

receiving input from the user by dragging and dropping or by clicking, and
modifying content of said deformation area according to the input.

6. The method according to claim 1, wherein the deformation area comprises a deformation sphere defined in four dimensions around said control point, wherein said deformation sphere is constrained in space and time by a spatial and temporal radius.

7. The method according to claim 6, wherein the control point comprises a center point of the deformation area, wherein the norm of the transformation vector of said vector field at the center point is $\|V\|$, and wherein the norm of the transformation vector of said vector field shortens to zero outside the deformation sphere.

8. The method according to claim 1, further comprising:
receiving input from a user on at least one of the control point and the deformation area, and
modifying content of said deformation area according to the input.

9. A system for segmenting image sets, said system comprising:
a computer
a computer readable medium, and
computer program instructions recorded on the computer readable medium that when executed by the computer cause the system to at least
define deformation by at least one four-dimensional control point in a deformation area defined in four dimensions, wherein the deformation area is spatially and temporally constrained, wherein said deformation is done using spatial and temporal coordinates,
modify a content of said deformation area around said control point, wherein the modifying comprises transforming spatial and temporal coordinates of a point in the deformation area, wherein said transforming happens according to a vector field defined in terms of a transformation of said control point and difference between said control point and said point in the deformation area, the difference being calculated using spatial and temporal coordinates, wherein a norm of the transformation vector of said vector field at the control point is $\|V\|$, and wherein the norm of the transformation vector of said vector field is shorter than $\|V\|$ at a border of the deformation area, and
repeat the defining deformation and modifying.

10. The system according to claim 9, wherein said deformation area comprises a plurality of deformation area points defined in spatial and temporal coordinates and said deformation area points span more than one spatial location and more than one time instance around said control point.

11. The system according to claim 9, wherein the system is caused to modify the content based on said deformation area and said control point by transforming spatial and temporal coordinates in the deformation area, and wherein said transforming is caused to happen according to a vector field defined in terms of a transformation of said control point and distance between said control point and said content point, the distance being calculated using spatial and temporal coordinates.

12. The system according to claim 9, wherein the control point is a point in a four-dimensional space, wherein the deformation area comprises a deformation sphere defined in four dimensions around said control point, wherein said deformation sphere is constrained in space and time by a spatial and temporal radius, wherein the control point comprises a center point of the deformation area.

13. The system according to claim 9, further comprising:
- user interface circuitry and user interface software configured to facilitate user control of at least some functions of the system through use of a display and configured to respond to user input; and
- a display and display circuitry configured to display at least a portion of a user interface of the system, the display and display circuitry configured to facilitate user control of at least some functions of the system.

14. The system according to claim 9, wherein the computer program instructions further cause the system to receive input from a user on at least one of the control point and the deformation area and to modify content of said deformation area according to the input.

15. A computer program product, comprising:
- a non-transitory computer readable medium; and
- computer program instructions recorded on the computer readable medium and executable by a processor for carrying out a method for segmenting image sets, the method comprising
- defining deformation in a computer by at least one four-dimensional control point in a deformation area defined in four dimensions, wherein the deformation area is spatially and temporally constrained, and wherein said defining of said deformation is done using spatial and temporal coordinates,
- modifying in a computer a content of said deformation area around said control point, wherein the modifying comprises transforming spatial and temporal coordinates of a point in the deformation area, wherein said transforming happens according to a vector field defined in terms of a transformation of said control point and difference between said control point and said point in the deformation area, the difference being calculated using spatial and temporal coordinates, wherein a norm of the transformation vector of said vector field at the control point is $\|V\|$, and wherein the norm of the transformation vector of said vector field is shorter than $\|V\|$ at a border of the deformation area, and
- repeating the defining deformation and the modify.

16. The computer program product according to claim 15, wherein the computer program instructions are further for receiving input from a user on at least one of the control point and the deformation area and for modifying content of said deformation area according to the input.

* * * * *